April 10, 1928.  
R. W. JOY  
TANK CAR DOME CLOSURE  
Filed Aug. 8, 1925
1,665,368
2 Sheets-Sheet 1
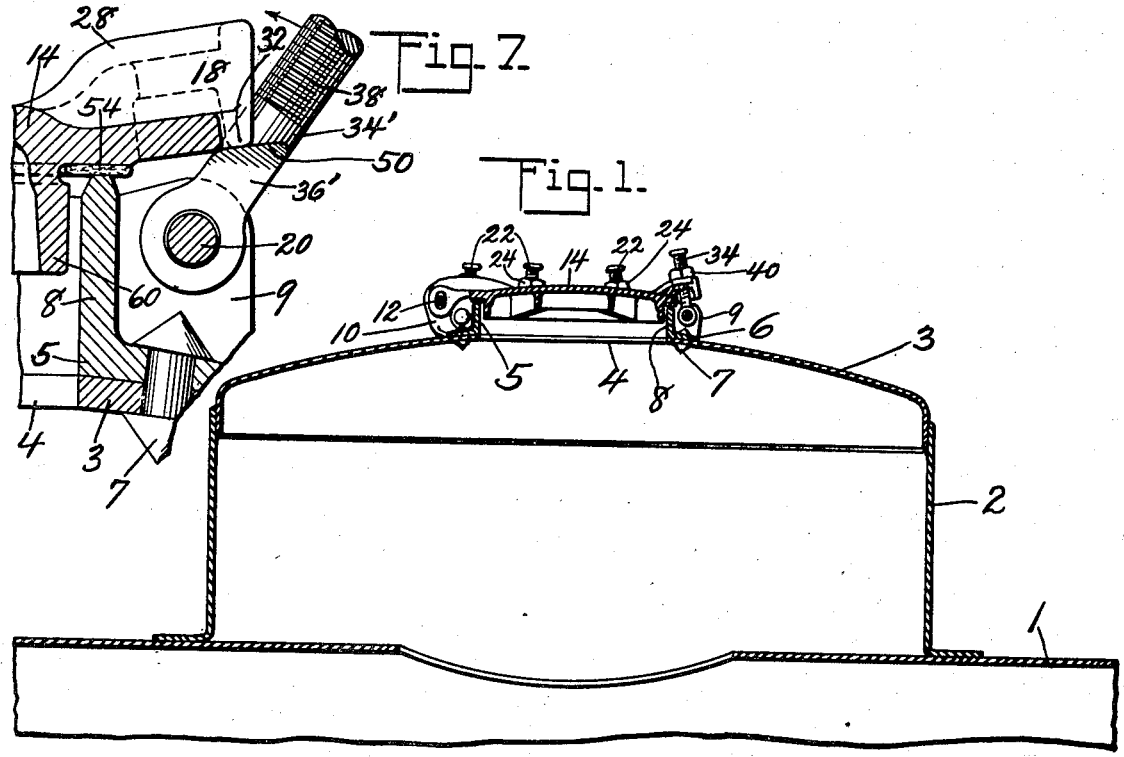
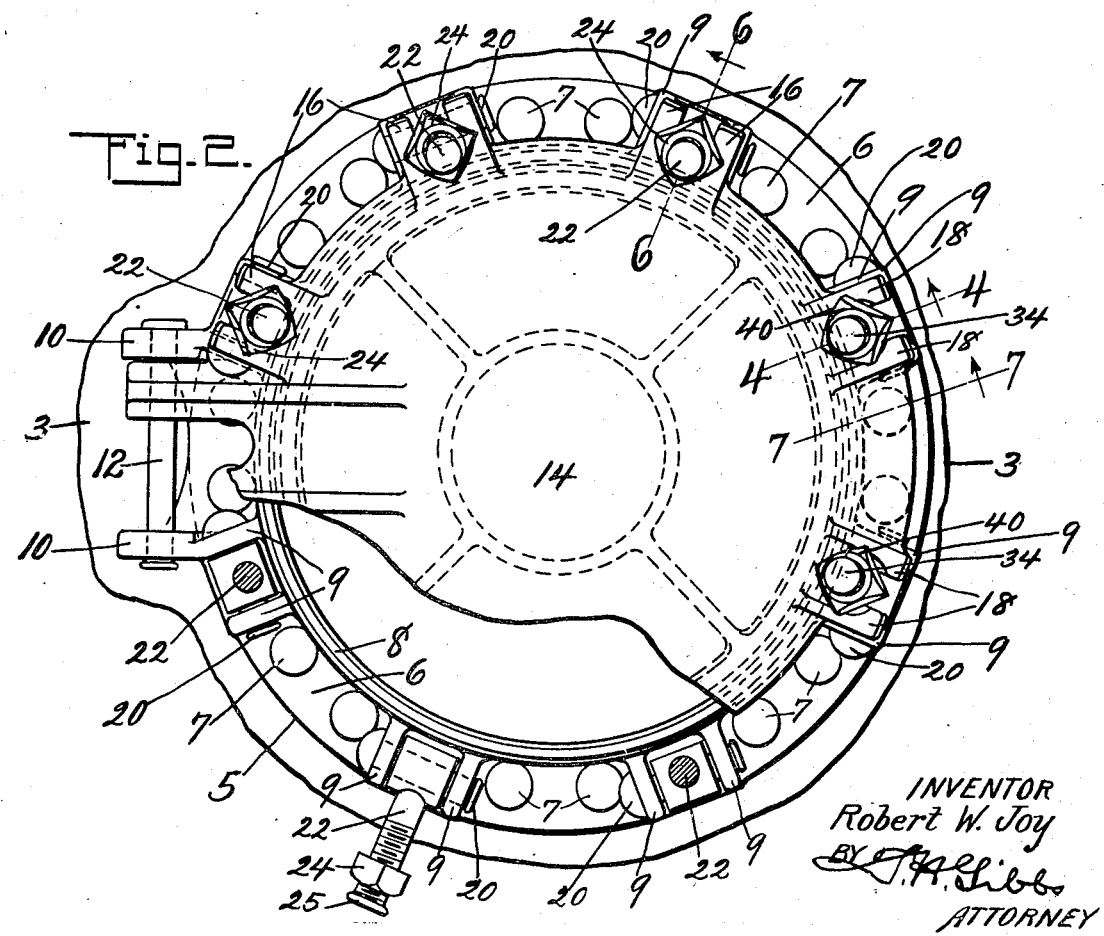
INVENTOR
Robert W. Joy
ATTORNEY April 10, 1928.
R. W. JOY
1,665,368
TANK CAR DOME CLOSURE
Filed Aug. 8, 1925
2 Sheets-Sheet 2
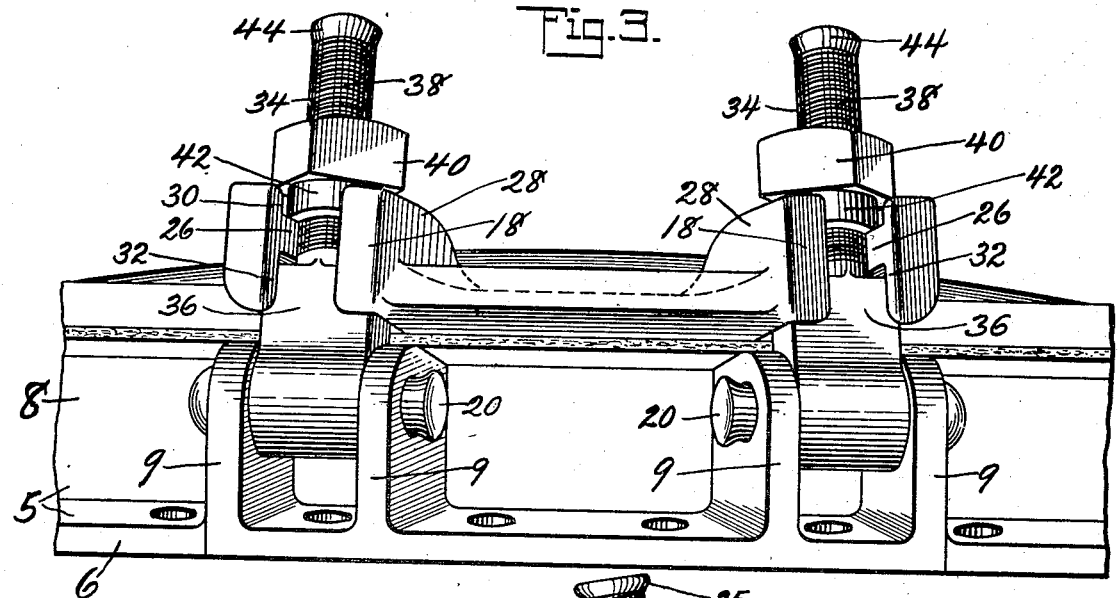
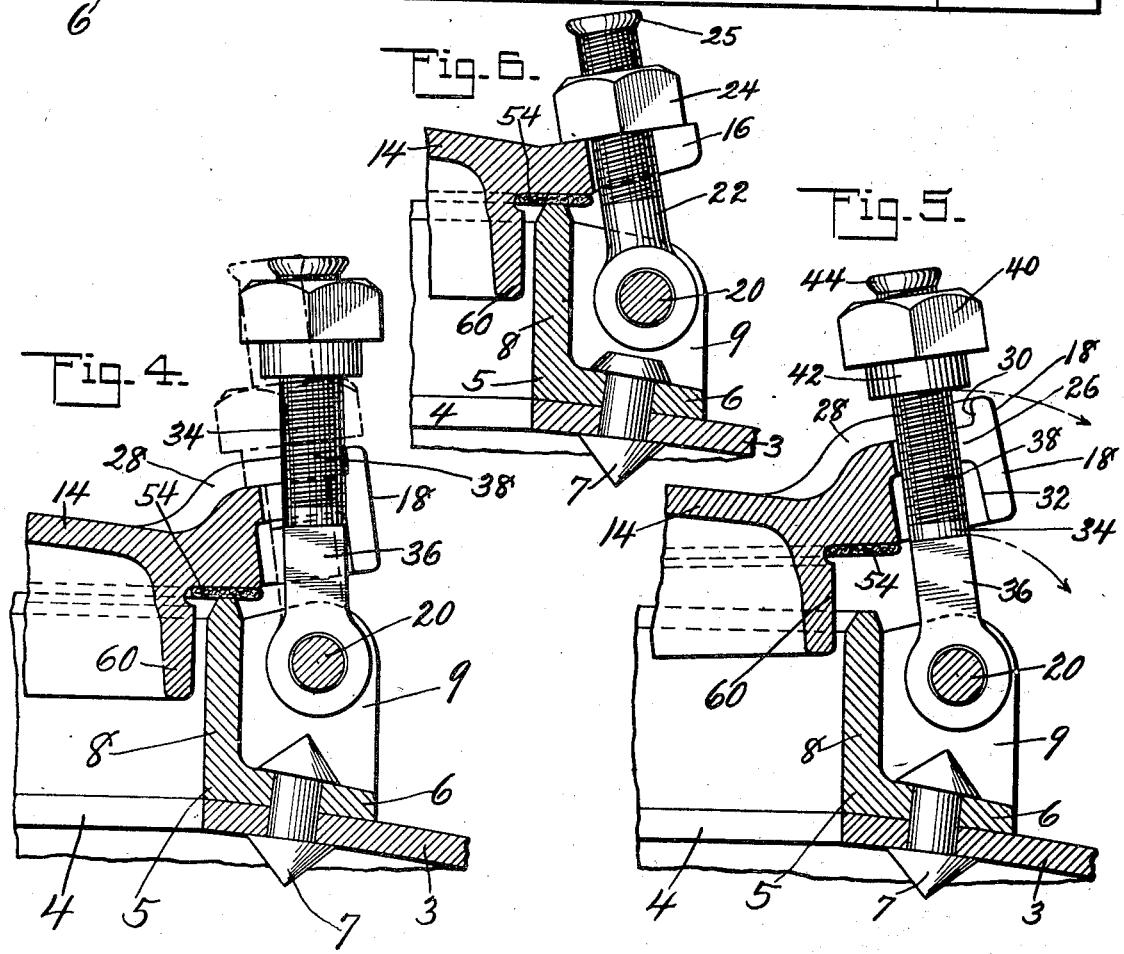
INVENTOR
Robert W. Joy
BY J. H. Libby
ATTORNEY Patented Apr. 10, 1928.

1,665,368

UNITED STATES PATENT OFFICE.

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY.

TANK-CAR-DOME CLOSURE.

Application filed August 8, 1925. Serial No. 49,048.

This invention relates to dome covers for car tanks in which such liquids are transported and it is an object of this invention to provide an improved securing means for the dome covers of such tanks so constructed that any pressure in the tank must be vented before the dome cover can be opened.

It is also an object of this invention to provide a securing means for car tank dome covers which so interlocks with the dome cover that the dome cover must be raised sufficiently to vent any pressure in the tank before the securing means can be disengaged from the dome cover and which can not be disengaged from the dome cover so long as the pressure in the tank is sufficient to hold the dome cover raised.

It is also an object of this invention to provide a securing means of the type described which limits the opening of the dome cover when there is pressure in the tank to a degree which will speedily vent the pressure in the tank without danger of spilling of the tank contents.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a central vertical section of a car tank dome equipped with a dome cover securing means constructed in accordance with this invention;

Figure 2 is a top plan view of the dome cover shown in Fig. 1, parts being broken away to show other parts more clearly;

Figure 3 is a side elevation of a portion of the dome cover shown in Fig. 1, the cover being shown in closed position and the securing means shown adjusted to hold the cover in closed position;

Figure 4 is a section taken on the line 4—4 of Fig. 2 showing the cover closed and the nut of the securing means raised preparatory to releasing the securing means;

Figure 5 is a section similar to Fig. 4, showing the nut of the securing means as in Fig. 4 and the cover raised slightly to permit the release of the securing means;

Figure 6 is a section taken on the line 6—6 of Fig. 2; and

Figure 7 is a view of a modified form of dome cover securing means, the section of the dome ring being taken as on the line 4—4 of Fig. 2, and the section of the dome cover being taken as on the line 7—7 of Fig. 2.

In the transportation of liquids in railway tank cars, particularly in connection with such liquids as casing head gasoline, it is frequently found that sufficient of the liquid is vaporized during the time of transporting to raise the pressure in the tank to a degree which renders it necessary for the protection of both the operator and the tank contents that the pressure be vented slowly before the cover is thrown to the full open position.

In the drawings the invention is shown applied to a car tank 1 having the usual dome 2 which is provided with a dome head 3 having the manhole opening 4. Surrounding the opening 4 is the dome ring 5 having a flange 6, which is secured to the dome head 3 by any suitable means as by rivets 7, and an upwardly projecting flange 8, the flanges 6 and 8 being joined at regular and suitable intervals by pairs of lugs 9. The dome ring 5 is also provided with outwardly projecting spaced lugs 10 in which is mounted a pin 12 on which is pivotally supported a dome cover 14 having outwardly projecting bifurcated lugs 16 and 18.

The lugs 16 and 18 on the cover 14 are spaced to correspond with the pairs of lugs 9 on the ring 5 and are adapted to receive bolts pivotally mounted on pins 20 secured in the lugs 9. The lugs 16 comprise projecting arms receiving the pivotally mounted cylindrical bolts 22 in the slots formed therein and having flat upper surfaces which are engaged by nuts 24 threaded on the bolts 22 and secured thereon by the enlarged heads 25 of the bolts 22. The lugs 18 of which two are shown in this construction, although more or less may be used as desired, are placed substantially diametrically opposite the cover hinge and comprise projecting arms 26 having flanges 28 along their outer edges and at their outer ends, the flanges 28 extending both above and below the arms 26 so that there are formed shoulders 30 which project above the arms 26 and shoulders 32 which project below the arms 26. The lugs 18 receive bolts 34 which are pivotally mounted on the pins 20 of the adjacent pairs of lugs 9, so as to be laterally shiftable (swingable) into and out of engagement between the cover lugs 18. The bolts 34 have rectangular portions 36 adjacent the pins 20 and cylindrical threaded portions 38 at their outer ends on which are threaded nuts 40 having cylindrical extensions 42 which project towards the rectangular portions 36 of the bolts. The nuts 40 are secured on the bolts 34 by the enlarged heads 44. The rectangular portions 36 of the bolts are of such dimension that they will engage beneath the arms 26 of the lugs 18 and in back of the shoulders 32 formed thereon while the extensions 42 on nuts 40 are of such dimension that they will engage the arms 26 of the lugs 18 in back of the shoulders 30 formed on the upper surfaces of the arms 26. Thus the bolts 34 are locked against disengagement from between the lugs 18 by engagement of their portions 36 or of their nuts 40 behind the shoulders 32 or 30, as the case may be.

In the modified construction as shown in Figure 7 the bolt 34' is secured by pin 20 in the pair of lugs 9 formed on the dome ring 5 and is provided with a threaded portion 38 as in construction shown in Figures 3, 4, and 5. In this construction however the upper surfaces of the rectangular portion 36' are inclined as shown at 50 so that as the bolt is moved towards the lugs 18 the inclined surfaces 50 will engage with the bottom surfaces of the shoulders 32 and raise the cover to permit the rectangular portion 36' to be brought in back of the shoulders 32.

In operation, in order to close the cover in the construction shown in Figures 3, 4, and 5, the nuts 40 on bolts 34 are unscrewed until they are at extreme outer ends of the bolts whereupon the cover 14 is brought to a position in which it is nearly in contact with the upwardly projecting flange 8 of the dome ring 5 and the bolts 34 raised into the slots of the lugs 18, the cover 14 being held sufficiently high that the rectangular portions 36 of the bolts 34 will pass beneath the shoulders 32 on the arms 26 of the lugs 18 while the nuts 40 on the bolts 34 will pass above the shoulders 30 on the arms 26. With the bolts 34 introduced into the slots of lugs 18 the cover 14 is brought to its seat on the dome ring 5 with the packing 54 in engagement with the upper edge of the flange 8 of the dome ring 5. As the cover 14 is brought into engagement with the dome ring 5 the shoulders 32 on the arms 26 are brought down outside of the rectangular portions 36 of the bolts 34 and the bolts are held in position in the slots in the lugs 18. The cover 14 is then secured in closed position by tightening the nuts 40 on the bolts 36 which operation brings the nuts 40 into engagement with the arms 26, the extensions 42 on the nuts 40 engaging in back of the shoulders 30 on the arms 26. The bolts 22 are then introduced into the slots of the lugs 16 and the nuts 24 tightened to aid the bolts 34 in securing the cover to the dome ring.

Where the bolts are constructed as shown in Figure 7 the operation of securing the cover in position is as just described except that it is not necessary to raise the cover in order to introduce the bolts 34' in the slots of the lugs 18 as the inclined surfaces 50 of the bolt 34' will, by means of their engagement with the shoulders 32, raise the cover 14 permitting the rectangular portion 36' of the bolt to be placed in back of the shoulders 32.

To open a cover which is secured by a securing means constructed in accordance with this invention the nuts 24 on the bolts 22 are loosened and the bolts 22 removed from the slots in the lugs 16. The nuts 40 on the bolts 34 are then loosened, being unscrewed until substantially in contact with the head 44, and the cover raised to such a point that the rectangular portions 36 of the bolts 34 will pass beneath the shoulders 32 while the extensions 42 on the nuts 40 will pass above the shoulders 30. In this position the bolts 36 may be withdrawn from the slots in the lugs 18. If, when it is desired to open the cover 14, there is pressure in the tank sufficient to force the cover upwardly as the nuts 40 are loosened then the extensions 42 on the nuts 40 will be kept in engagement with the shoulders 30 on the lugs 18 so long as the pressure forces the cover upwardly and while thus held the nuts 40 prevent the removal of the bolts 34 from the slots in the lugs 18 and prevent the opening of the cover to its full open position. It will be noted that with the nuts 40 moved to their outer limits on the bolts 34 pressure in the tank may force the cover 14 upwardly to such an extent that there is an opening between the inwardly projecting annular flange 60 on the cover 14 and the upwardly projecting flange 8 on the dome ring 5 which permits a venting of the pressure in the tank which will be sufficiently rapid to prevent any unnecessary delay in the opening of the cover and which will not be sufficiently rapid to cause discharge of the tank contents through the opening. It will also be noted that should the nuts 40 on the bolts 34 be loosened before the nuts 24 on the bolts 22 are loosened and the bolts 22 removed from the slots in the lugs 16 it is impossible to disengage the bolts 34 from the lugs 18 because of the engagement of the shoulders 32 on the lugs 18 with the rectangular portions 36 on the bolts 34. Should there be pressure in the tank when the nuts 40 are loosened before the nuts 24 then upon the loosening of the nuts 24 on the bolts 22 the pressure in the tank will force the cover upwardly until the lugs 18 engage with the nuts 40 whereupon the bolts 34 will be interlocked with the lugs 18 until the pressure has been vented from the tank and the cover 14 drops sufficiently to disengage the extensions 42 on the nuts 40 from the shoulders 30 on the lugs 18.

What is claimed is:

1. In combination, a tank closure, and fastenings normally holding said closure in closed position and necessitating the raising of the cover to a predetermined partly open position before they can be disengaged from the closure to allow complete removal of the latter.

2. The combination with a tank having a manhole opening and a closure therefor, of means for holding the closure in closed position comprising a bolt laterally shiftable to release the same and engaged against such movement when the closure is closed, and releaseable only subsequent to raising of the closure to a predetermined position.

3. The combination with a tank having a manhole opening and a closure therefor, of means for holding the closure in closed position comprising a bolt pivoted on the tank and interlocking with the closure below its nut against release, but releaseable subsequent to raising the closure only a limited distance.

4. The combination with a tank having a manhole opening and a closure therefor, of holding means for the closure movable to disengage and release the same, but interlocking with the closure against such movement when the closure is closed and also when it is forced upward by pressure in the tank, and releaseable from the cover only when the latter is in a partly raised position.

5. The combination with a tank having a manhole opening and a closure therefor, of means for holding the closure in closed position comprising a bolt and nut laterally shiftable to release the closure, said bolt interlocking with the closure against such movement when the closure is closed and said nut interlocking with the closure when the closure is forced upward by pressure in the tank.

6. The combination with a tank having a manhole opening of a closure for said opening having a lug, a bolt pivotally secured to the tank and a nut on said bolt for preventing opening of said closure, said bolt interlocking with said lug when said closure is in closed position irrespective of the position of the nut.

7. The combination with a tank having a manhole opening of a closure for said opening having a lug and a bolt pivotally secured to said tank and engaging said lug, said lug having shoulders holding said bolt in engagement with said lug when said closure is in closed position and said bolt adapted to be released only when the closure is raised a predetermined amount.

8. The combination with a tank having a manhole opening of a closure for said opening having a shouldered lug, a bolt pivotally secured to said tank, a nut on said bolt engaging said lug, said shoulders on said lug engaging said nut and preventing release of said bolt from said lug when said closure is forced upwardly by pressure in the tank and means on the bolt engaging the lug in the closed position of the closure to prevent release of the bolt.

9. The combination with a tank having a manhole opening of a closure for said opening having a projecting lug, a bolt movably secured to said tank and a nut on the bolt for holding the closure in closed position, and cooperating means on said lug and bolt preventing release of said bolt from said lug irrespective of the position of the nut when said closure is in closed position.

10. The combination with a tank having a manhole opening of a closure for said opening having a projecting lug, means comprising a bolt movably secured to said tank for holding the closure in closed position, and cooperating means on said lug and bolt preventing release of said bolt from said lug when said closure is forced upwardly by pressure in the tank and when the closure is in closed position, said bolt adapted to be released only when the closure is raised a predetermined amount.

11. The combination with a tank having a manhole opening of a closure for said opening having a projecting lug, a bolt movably secured to said tank and a nut on the bolt for holding the closure in closed position, means on said lug and bolt preventing release of said bolt from said lug when the closure is in closed position and co-operating means on the lug and nut for preventing the release of the bolt when said closure is forced upwardly by pressure in the tank, said cooperating means being disengaged to release said bolt from said lug upon the reduction of the pressure in the tank.

12. The combination with a tank having a manhole opening of a closure for said opening having a projecting shouldered lug, a bolt, and a nut on said bolt to engage said closure, said bolt being pivotally secured to said tank and held in engagement with said lug by said lug shoulders irrespective of the position of the nut when said closure is in closed position.

13. The combination with a tank having a manhole opening of a closure for said opening having a projecting shouldered lug, a bolt pivotally secured to said tank and a nut on said bolt, said bolt and nut each engaging said shoulders on said lug for holding said bolt in engagement with said lug.

14. The combination with a tank having a manhole opening of a closure for said opening having a projecting shouldered lug and a bolt pivotally secured to said tank and held in engagement with said lug by said lug shoulders when said closure is in closed position, said bolt being disengaged from said shoulders upon the raising of said closure.

15. The combination with a tank having a manhole opening of a closure for said opening having a projecting shouldered lug, a bolt pivotally secured to said tank and engaging shoulders on said lug to prevent release of the bolt when the closure is in closed position, and a nut on said bolt, said nut engaging said shoulders on said lug and preventing release of said bolt from said lug when said closure is forced upwardly by pressure in the tank, said shoulders being disengaged from said nut upon the venting of the pressure in the tank.

16. The combination with a tank having a manhole opening and a closure therefor, of holding means for the closure comprising a bolt pivoted to the tank interlocking with the closure against disengagement therefrom irrespective of the position of its nut when the closure is closed, and also interlocking with the closure when the same is forced upward by pressure in the tank.

17. The combination with a tank having a manhole opening of a closure for said opening having a projecting lug, a bolt secured to said tank and cooperating means on said lug and bolt preventing release of said bolt from said lug unless said closure is raised a predetermined distance and when said closure is forced upwardly above said predetermined distance by pressure in the tank, said bolt holding said closure in a position to retard the venting of pressure from the tank.

18. The combination with a tank structure having an opening therein and a cover structure for said opening, of restraining means for limiting rise of the cover from the tank normally engaging one of said structures and interlocked against disengagement, and releasable for disengagement subsequent to the raising of the cover, a predetermined distance only.

19. In a tank having a closure, a plurality of fastenings for normally holding the closure in closing position, certain of said fastenings being releasable from engagement with the closure irrespective of the position of the closure with relation thereto, the remaining fastenings being releaseable only when the closure is raised to a predetermined position.

In witness whereof I have hereunto set my hand.

ROBERT WM. JOY.